(12) United States Patent
Matsushita et al.

(10) Patent No.: US 6,333,756 B1
(45) Date of Patent: Dec. 25, 2001

(54) OPTICAL UNIT AND ITS MANUFACTURING METHOD AND ELECTROPHOTOGRAPHIC RECORDING DEVICE

(75) Inventors: Yukihiro Matsushita; Takao Sugano; Fumio Kaneko, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/546,182

(22) Filed: Apr. 10, 2000

(30) Foreign Application Priority Data

Sep. 14, 1999 (JP) .................................................. 11-260462

(51) Int. Cl.⁷ ............................. B41J 2/385; G03G 13/04
(52) U.S. Cl. ........................... 347/134; 347/242; 347/257
(58) Field of Search .................................... 347/118, 134, 347/137, 138, 233, 241, 242, 244, 245, 256, 257, 258; 362/259, 455; 359/204, 205, 206

(56) References Cited

U.S. PATENT DOCUMENTS

| 5,416,505 | * | 5/1995 | Eguchi et al. | 347/244 |
| 5,499,107 | * | 3/1996 | Kuroda | 347/258 |
| 5,506,719 | * | 4/1996 | Murakami et al. | 359/206 X |
| 5,701,191 | * | 12/1997 | Iwasaki | 359/205 |
| 5,758,950 | | 6/1998 | Naoe et al. . | |
| 5,991,063 | * | 11/1999 | Ando | 359/204 |
| 5,997,153 | * | 12/1999 | Naoe et al. | 362/259 |
| 6,181,363 | * | 1/2001 | Satoh | 347/242 X |

FOREIGN PATENT DOCUMENTS

| 1-233408 | 9/1989 | (JP) . |
| 1-238613 | 9/1989 | (JP) . |
| 9-243891 | 9/1997 | (JP) . |

* cited by examiner

*Primary Examiner*—Sandra Brase
(74) *Attorney, Agent, or Firm*—Armstrong, Westerman, Hattori, McLeland & Naughton, LLP (57) ABSTRACT

The present invention aims at providing an optical unit, its manufacturing method, and electrophotographic device that can easily and inexpensively achieve a reliable latent image formation on a photosensitive drum, and can form a high-quality image. To realize the above aims, a lens barrel and a collimating lens are bonded only at a single spot, and the bonding orientation is aligned approximately with a main scanning direction. Thereby displacement of the collimating lens caused by a thermal expansion of the adhesive is restricted to the main scanning direction as adjustable by other components.

10 Claims, 7 Drawing Sheets

OPTICAL UNIT AND ITS MANUFACTURING METHOD AND ELECTROPHOTOGRAPHIC RECORDING DEVICE

BACKGROUND OF THE INVENTION

The present invention relates generally to optical systems, and more particularly to an optical unit that collimates a beam radiated from a light source and scans in a predetermined direction. The present invention lends itself, for example, to a laser optical system for an electrophotographic recording device, and is applicable not only to a discrete printer, but generally to a combination apparatus having a printing function such as a photocopier and a facsimile unit.

The "electrophotographic recording device" by which we mean is a recording device employing the Carlson process as described in U.S. Pat. No. 2,297,691, as typified by a laser printer, and denotes a nonimpact image-forming device that provides a recording by depositing a developer as a recording material on a recorded medium (e.g., printing paper, and OHP film). The laser optical system as an optical system for exposure is typically a unit that includes a variety of light sources (e.g., a semiconductor laser, a He—Ne gas laser, a Ar gas laser, a He—Cd gas laser), a collimating lens, a rotating mirror, an f-θ lens, etc., serving to form a desired latent image on a photosensitive drum.

A laser printer as an example of the electrophotographic recording device has characteristics such as an excellent operability and cost efficiency, high-quality image formation, and a reduced vibration and noise during printing, and is thus expected to be increasingly demanded in future along with recent prevailing office automations. The laser printer generally includes a photosensitive drum and an optical unit for forming a latent image on the photosensitive drum by exposure to light. The photosensitive drum is uniformly negatively charged by a pre-charger, and exposed by a laser beam emitted from the optical unit, whereby an area on which a developing agent (toner) is to be deposited is discharged to form a latent image. The latent image is thereafter visualized into a toner image by a development device, and the toner image is transferred onto a printing paper by a transfer unit. A fixing device fixes the toner image that has been transferred on the printing paper, and the printing paper is then ejected.

The optical unit typically includes a laser beam source that radiates a laser beam, a collimator section that collimates (or renders parallel) the laser beam, a polygon mirror (rotating mirror) that allows the laser beam to change its traveling direction to make a scan, an f-θ lens that corrects a distortion of the laser beam, a print start detector section that adjusts print timing, and other necessary mirrors. A semiconductor laser providing a low cost and excellent maintainability has been predominantly used for the laser beam source.

The optical unit using the semiconductor laser radiates, so that the longer the radiating distance is, the wider it spread-out from the light source as a vertex of cone (a laser beam with a spreading angle from a point light sourc)e. The collimator section, which is located near the light source, collimates the laser beam to make a parallel beam fit for the exposure to the photosensitive drum. In order to expose a larger area in a single operation and speed up the writing action onto the photosensitive drum, the number of semiconductor lasers to be provided is normally plural, i.e., two or more, and the equal number of collimator sections are provided accordingly.

The collimator section includes a cylindrical lens barrel and a collimating lens. The lens barrel is fitted with and holds the collimating lens, and intercepts extraneous light. The collimating lens, which serves to collimate a radiated beam, is stuck at a whole face or several spots of its circumference to the lens barrel typically with a resinous adhesive in view of its manufacturing cost. Incidentally, an injection of the adhesive is manually given with an injector. The collimated beam is reflected by a rapidly rotating polygon mirror, passes through the f-θ lens, and then scans the photosensitive drum for a desired area to be exposed. The laser light that has passed through the f-θ lens exposes the photosensitive drum, and forms a latent image under print timing by the print start detector section.

Increasing demand for high-quality image formation in recent years has required the collimating lens that determines a traveling direction of the laser beam to be accurately attached in the lens barrel to form a precise latent image on the photosensitive drum. In a conventional optical unit, however, thermal deformation of the adhesive for the collimating lens would disadvantageously displace the collimating lens in the lens barrel, so as to deteriorate an image quality.

Associated with a use of the laser printer, the optical unit's temperature climbs up to about 60° C. by heat generated in the fixing device, a motor, a printed board or the like in the printer, and a motor for the polygon mirror or a control printed board or the like in the unit. This would cause a thermal expansion of the adhesive applied onto a whole face or several spots of the circumference of the collimating lens. A variety of amounts, forms, and positions of the adhesive around the circumference of the lens leads to a variety of thermal deformations of an adhesive layer, and thus the collimating lens would be displaced in an unforeseeable direction, for example, by about 10–30 μm, changing a laser-beam emitting position.

The shift direction of the collimating lens may be represented by a main scanning direction and a sub-scanning direction, but acceptable shift amount in the sub-scanning direction is much smaller than the acceptable shift amount in the main scanning direction. The main scanning and sub-scanning directions respectively correspond to the polygon mirror's circumferential and height directions. Even if the laser beam is displaced in the main scanning direction, the mirrors and lenses in them subsequent stage may generally detect the beam using the rotating polygon mirror. Therefore, based on their detection, the displaced beam may be adjusted by changing timing of the laser beam emission as disclosed in Japanese Laid-Open Patent Application No. 9-76559 or by shifting the beam using a refractive index of glass as disclosed in Japanese Laid-Open Patent Application No. 10-260368. However, the beam deviated in the sub-scanning direction would move in the height direction so that the polygon mirror cannot lead the beam to fall on the subsequent mirrors and lenses, and the subsequent mirrors and lenses thus cannot detect the beam. Consequently, that would disadvantageously make its latent image formation impossible or imperfect, or its print timing unable to be properly detected, thereby disabling printing function.

Further, in the optical unit equipped with two semiconductor lasers, the displacement of the collimating lenses would disadvantageously change its beam width, thereby making an contour of the latent image thick, or otherwise, so that a high-quality image could not be obtained.

To prevent the displacement of the collimating lens in the sub-scanning direction at high temperature, it is conceivable to provide a cooling device for cooling a lens and its surroundings or an adjustment means for detecting and correcting the displacement of the collimating lens in the sub-scanning direction, but this would unfavorably increase the device's complexity and manufacturing cost.

BRIEF SUMMARY OF THE INVENTION

Therefore, it is an exemplified general object of the present invention to provide a novel and useful optical unit, method of manufacturing the same, and electrophotographic recording device, in which the above disadvantages are eliminated.

Another exemplified and more specific object of the present invention is to provide an optical unit and its manufacturing method, and an electrophotographic recording device that can realize latent image formation on a photosensitive drum easily, inexpensively and precisely, to form a higher-quality image.

In order to achieve the above objects, an optical unit according to one exemplified embodiment of the present invention comprises a light source, a collimator section which collimates a beam radiated from the light source, and a scanner section which scans using a beam from the collimator section, while the collimator section includes a holding member, and a collimating lens partly bonded at a single spot with an adhesive onto the holding member, the spot between the collimating lens and the holding member being placed within an adjustable angular range with respect to a main scanning direction of the scanner section. According to this optical unit, the bonding spot is placed within the adjustable angular range with respect to the main scanning direction of the scanner section.

Moreover, a method of manufacturing an optical unit as another embodiment of the present invention, the optical unit comprising a light source, a collimator section that collimates a beam radiated from the light source and includes a block, a lens barrel and a collimating lens, and a scanner section that scans using a beam from the collimator section comprises the steps of partly bonding the collimating lens at a single spot with an adhesive on the lens barrel, and fixing the lens barrel onto the block so that the spot between the collimating lens and the lens barrel may be placed within ±30° with respect to a main scanning direction of the scanner section. This manufacturing method does not consider a positioning adjustment between the bonding spot and the main scanning direction when the collimating lens is to be bonded, while considering that when mounting the lens barrel onto the block. The optical unit as accordingly manufactured limits the bonding spot to be placed within ±30° with respect to the main scanning direction, and thus a shift amount of the collimating lens in the sub-scanning direction by a thermal expansion of the adhesive is more restricted than that as conventionally manufactured. This manufacturing method may cover such an embodiment that rotatably secures the lens barrel onto the block and then adjusts positioning the alignment between the bonding spot and the main scanning direction.

Further, an electrophotographic recording device as still another embodiment of the present invention comprises a photosensitive body, a pre-charger which charges the photosensitive body, an optical unit which exposes the photosensitive body and forms a latent image thereon, a development device which visualizes the latent image as a toner image with a developer, a transfer device which transfers the toner image onto a recorded medium, and a fixing device which fixes the toner image onto the recorded medium. This recording device has the same effect as the above optical unit.

Other objects and further features of the present invention will become readily apparent from the following description of the embodiments with reference to accompanying drawings.

DETAILED DESCRIPTION OF INVENTION

Figure 1:
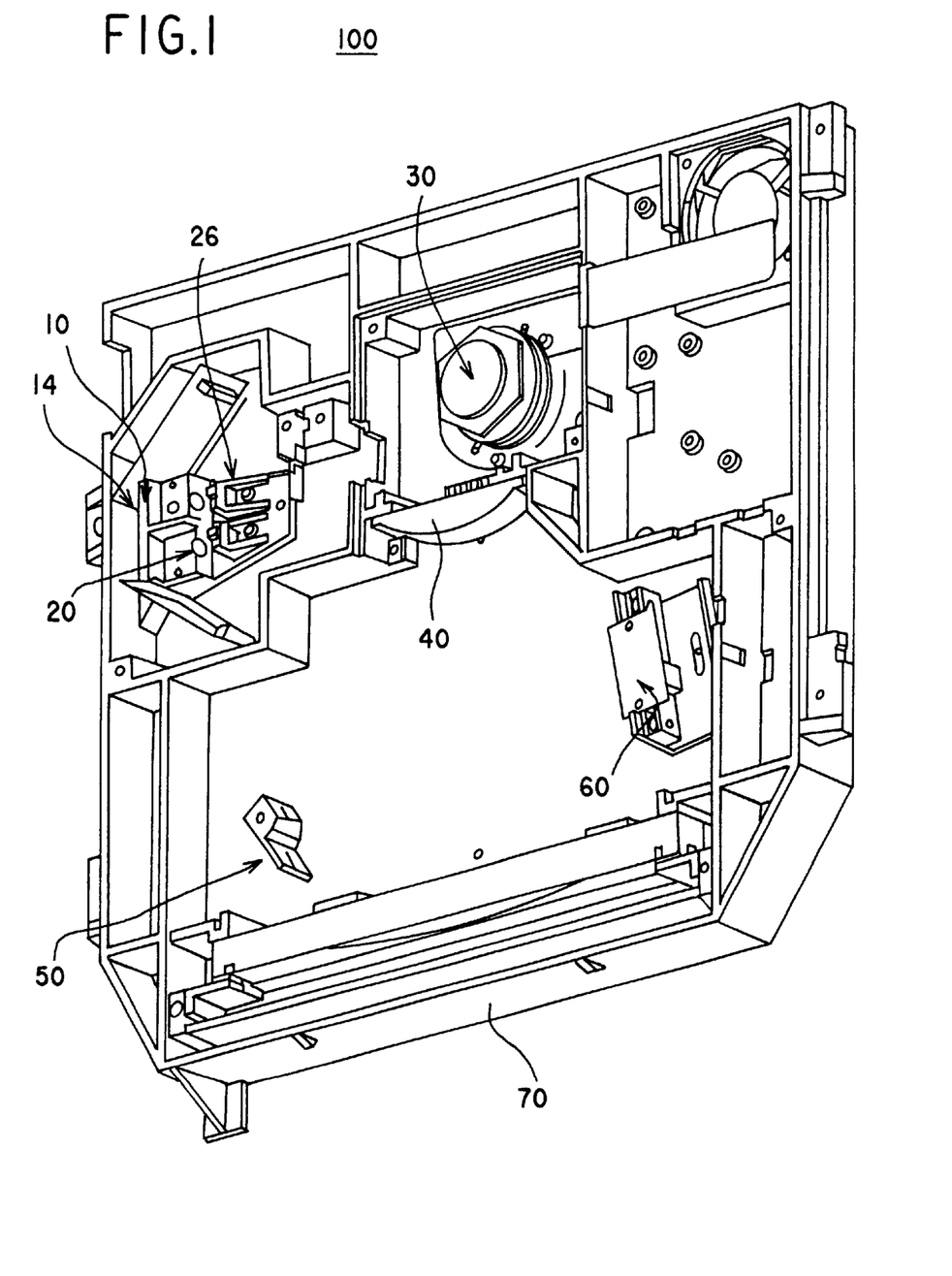
FIG. 1 is a perspective overview of an optical unit of one embodiment according to the present invention.
Figure 2:
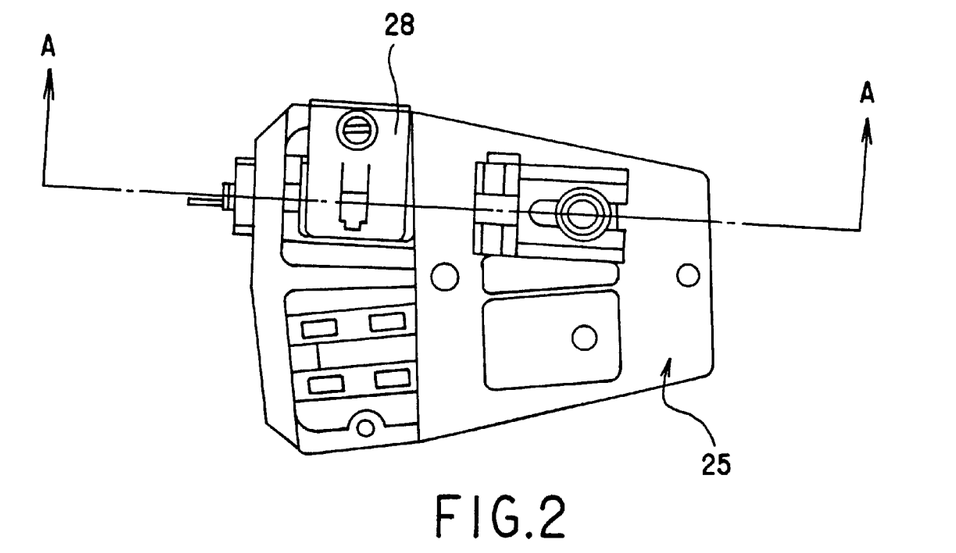
FIG. 2 is a magnified plan view of a block of the optical unit shown in FIG. 1.
Figure 3:
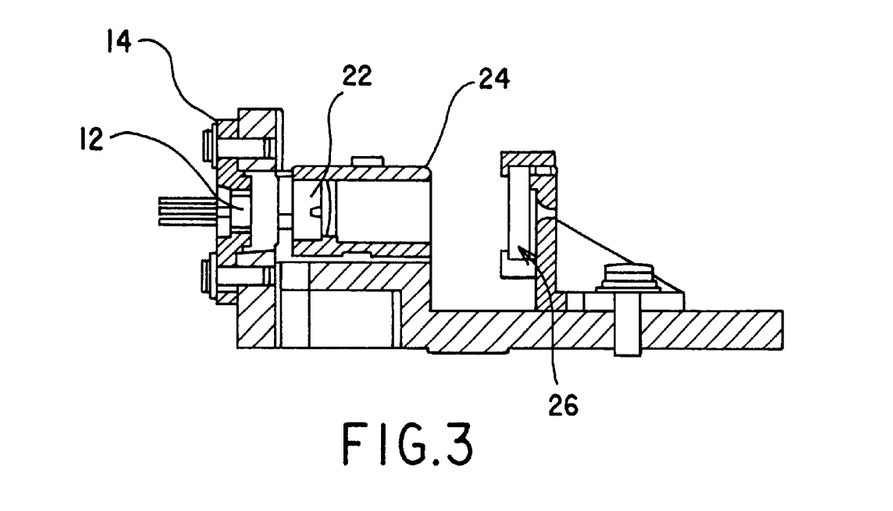
FIG. 3 is a sectional view taken along a line A—A of the block shown in FIG. 2.
Figure 4:
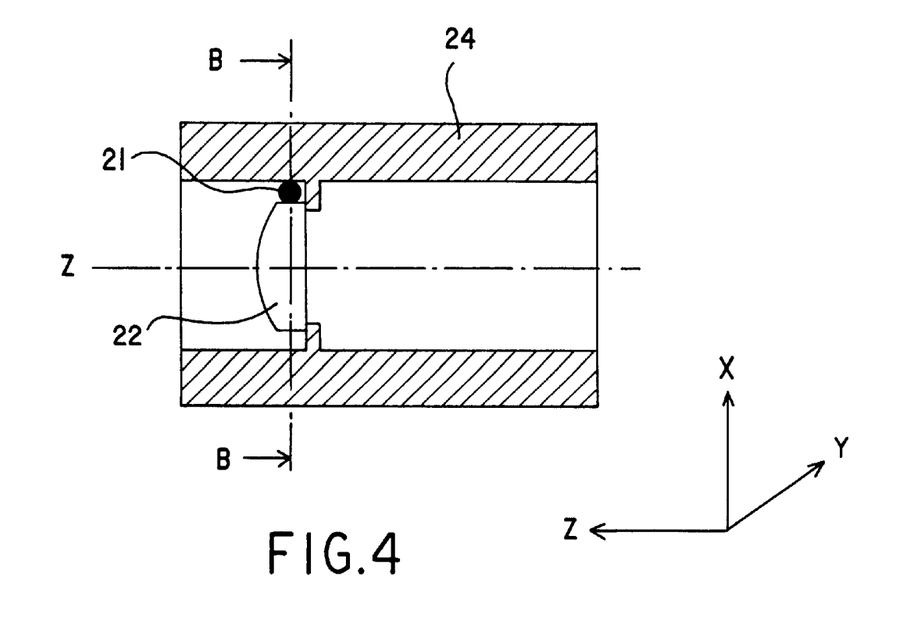
FIG. 4 is a schematic sectional view for explaining a bonding spot in a collimator section.
Figure 5:
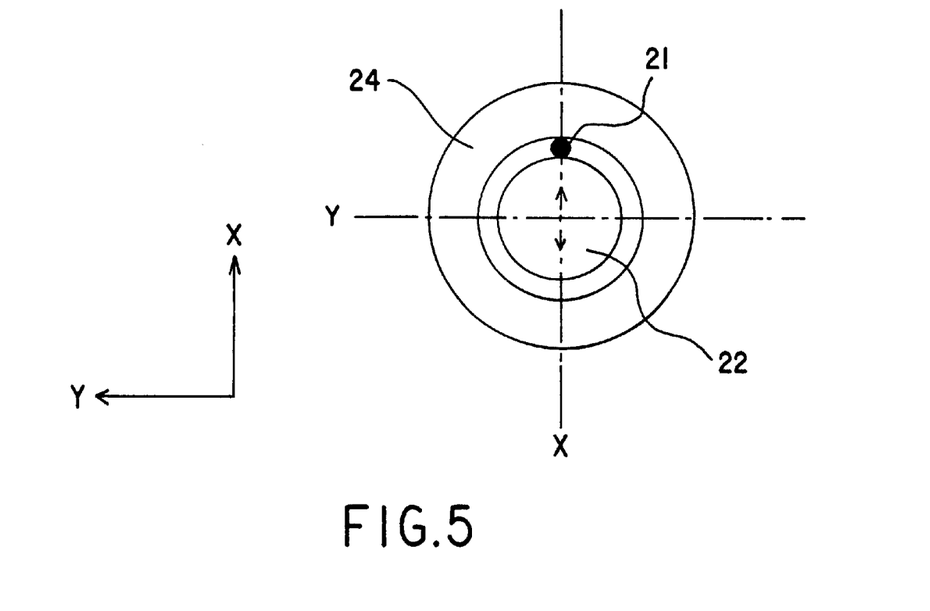
FIG. 5 is a sectional view taken along a line B—B of the collimator section shown in FIG. 4.
Figure 6:
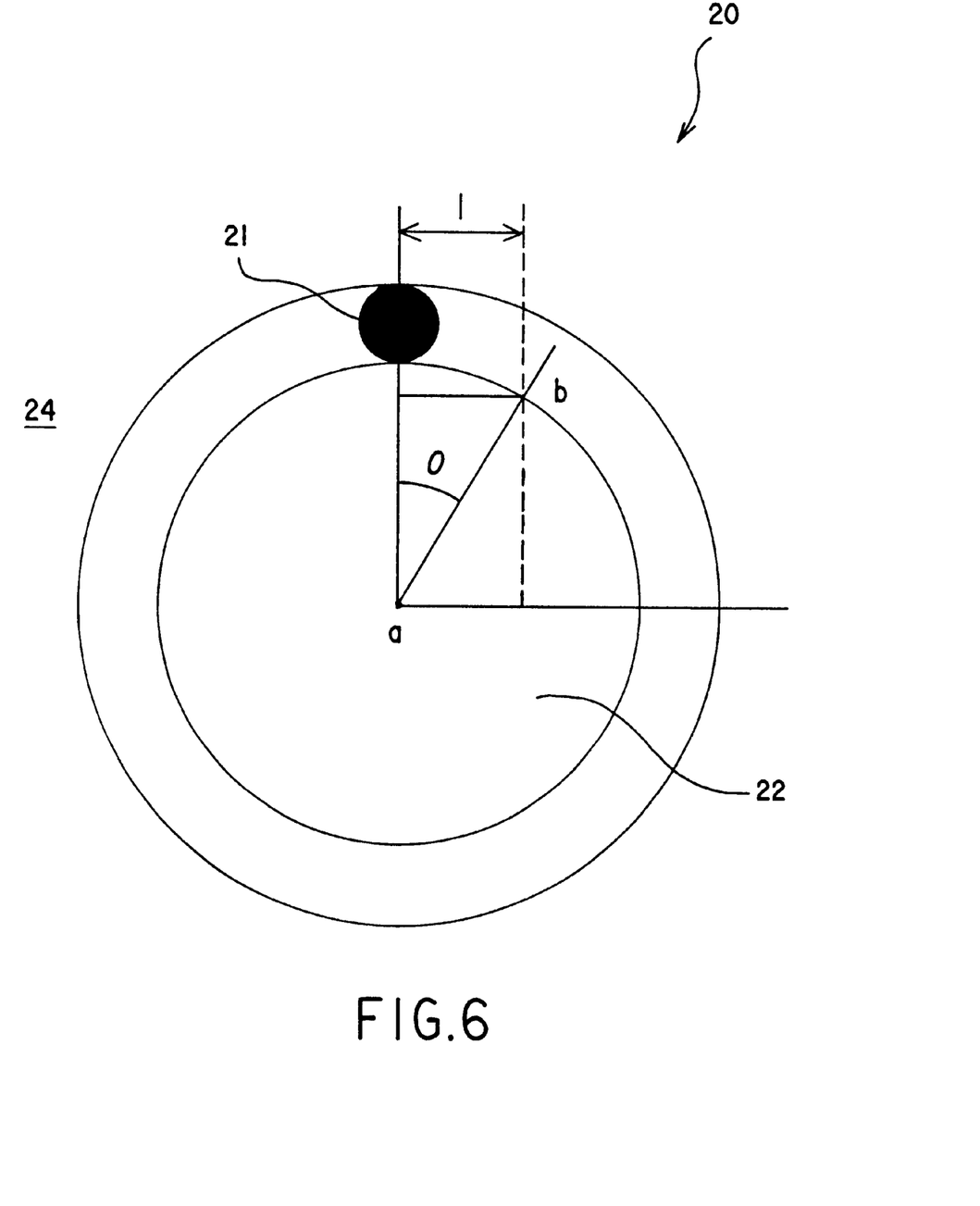
FIG. 6 is a magnified view of the collimator section for working out an acceptable range of displacement of a collimating lens.

A description will now be given of an optical unit 100 as one embodiment of the present invention, with reference to FIGS. 1 to 6 inclusive. The elements are identified by the same reference numerals, and a duplicate description thereof will be omitted. Hereupon, FIG. 1 is a perspective overview of the optical unit 100. FIG. 2 is an enlarged plan view of a block 25 of the optical unit 100 shown in FIG. 1. FIG. 3 is a sectional view taken along a line A—A of the block 25 shown in FIG. 2. FIG. 4 is a schematic sectional view for explaining a bonding spot between a collimating lens 22 and a lens barrel 24 in a collimator section 20 shown in FIG. 3. FIG. 5 is a sectional view taken along a line B—B of the collimator section 20 shown in FIG. 4. FIG. 6 is an enlarged section of the collimating lens 22 shown in FIG. 5 for working out an acceptable range of its displacement.

Referring now to FIG. 1, the optical unit 100 comprises a laser light source 10, a heat sink 14, a collimator section 20, a polygon mirror 30, an f-θ lens 40, a cylindrical lens 42, a reflecting mirror 44, a folding mirror 50, and a print start detector section (or beam detection sensor, hereinafter referred to as BD sensor) 60. In the present embodiment, there are two provided laser light sources 10 and two collimator sections 20 respectively. Generally, the more light sources are provided, the more its image density and image-forming speed increase, which accordingly may rapidly form high-definition images.

The present embodiment uses, a semiconductor laser 12 as the laser light sources 10, but instead may use various uses light sources including a gas laser, an Ar laser, and the like. A different kind of light source has a different light-emission wavelength and luminosity, and the present embodiment has its wavelength ranging from 400 nm through 900 nm. The semiconductor laser 12 is currently in vogue due to its advantages in cost and maintainability, and can characteristically act as an optical switch. The semiconductor laser 12 is secured onto the block 25 which will be described later. The heat sink 14 is located in contact with the heat-generating semiconductor laser 12, and removes the laser 12-derived heat. Any structure known in the art may be employed for the semiconductor laser 12 and the heat sink 14, and a specific description will thus be omitted. The semiconductor laser 12 and heat sink 14 may sometimes be sold in one package. The laser light source 10 is controlled by a controller (not shown), which generally takes a concrete form of control board. The controller, which generates a print signal as a pulse signal for driving the semiconductor laser 12, is one of heat sources in the optical unit 100.

The collimator section 20, which is a member for collimating a dispersing or focusing laser beam, includes a collimating lens 22, a cylindrical lens barrel 24, a block 25, a cylindrical lens 26, and a leaf spring 28, as shown in FIGS. 2 to 5 inclusive.

The collimating lens 22, for instance, having an outer diameter of 6.37 mm, collimates a laser beam. The collimating lens 22, as shown in FIGS. 4 and 5, is partly bonded and secured at a single spot onto an inner surface of the lens barrel 24 with an adhesive 21. The term "partly" is used for the purpose of excluding a structure in which the collimating lens 22 is bonded on the lens barrel 24 by applying the adhesive 21 even only at a single spot but on an entire surface of the circumference of the collimating lens 22. An efficient collimation requires a proper adjustment of a relative position between the semiconductor laser 12 and the collimating lens 22. It is therefore necessary to adjust the relative position between a emission point of the semiconductor laser 12 and the collimating lens 22 in three-axis directions (x, y, z). The three axes, as shown in FIGS. 4 and 5, indicate the following directions respectively: the x-axis lies in the main scanning direction of the polygon mirror 30; the y-axis in the sub-scanning direction of the polygon mirror 30; and the z-axis the optical-axis direction of the laser beam from the laser light source 10.

The lens barrel 24 holds the collimating lens 22 via the adhesive 21, and blocks an incidence of extraneous light to the lens 22. Referring to FIGS. 4 and 5, the collimating lens 22 that is bonded at a single spot onto an inner surface of the lens barrel 24 via the adhesive 21. A clearance between the lens barrel 24 and the collimating lens 22 may range from 10 $\mu$m to 30 $\mu$m inclusive, and it is set to be 22.5 $\mu$m in the present embodiment. The adhesives 21 usable for bonding the collimating lens 22 and the lens barrel 24, in general, may include resinous adhesives such as silicon and epoxy, and the present embodiment adopts an ultraviolet cure adhesive, Hardloc, OP-4515 manufactured by Denki Kagaku Kogyo Kabushiki Kaisha. This adhesive has a thermal expansion coefficient of $1.68 \times 10^{-5}$. If temperature in the optical unit 100 changes from 20° C. to 60° C., thermal expansion quantity Q of the adhesive 21 can be calculated by the following equation.

$$Q = K \cdot C \cdot \Delta T \quad (1)$$

K denotes the thermal expansion coefficient, C denotes the clearance, and $\Delta T$ denotes the temperature increment. Substituting values of the present embodiment in the equation yields $1.68 \times 10-5 \times 22.5 \times (60-20)$, and the adhesive 21 thermally expands by 0.15 $\mu$m. Since a distance between the collimating lens 22 and a photosensitive drum 202, which will be described later, is approximately one hundred times as long as that between the laser light source 10 and the collimating lens 22, the thermal expansion of the adhesive 21 by 0.15 $\mu$m would lead to a displacement of 15 $\mu$m on the photosensitive drum 202.

The bonding spot is aligned with the axis x in the main scanning direction, or placed within ±30° with respect to the main scanning direction, preferably within ±11.5° if an acceptable pitch variation between beams is set to be 3 $\mu$m or below. Accordingly, even the thermal expansion of the adhesive 21 due to the temperature rise in the unit may cause the lens 22 to move mainly in the main scanning direction x, but only by a limited quantity in the sub-scanning direction. The value 11.5° may be worked out by a geometric technique shown in FIG. 6. As the variation quantity in the laser beam is set within 3 $\mu$m, 1 in the figure may become 3 $\mu$m. The laser beam displaces by 15 $\mu$m at the maximum. Accordingly, a distance (ab) between a center (a) of the collimating lens 22 and a circumferential point (b) is 15 $\mu$m. An allowable displaceable angle of the collimating less 22 is therefore obtained using a trigonometric function by the following equation.

$$\alpha = \beta \cdot \sin \theta \quad (2)$$

$\alpha$ is the maximum acceptable laser displacement (3 $\mu$m), $\beta$ is the maximum laser displacement (15 $\mu$m), and $\theta$ is an acceptable angle. Consequently, $\theta = 11.5°$ results. However, since the maximum acceptable laser displacement $\alpha$ is constantly 3 $\mu$m, the acceptable angle (which the bonding spot forms) $\theta$ varies depending on the maximum laser displacement $\beta$. Accordingly, if the bonding spot is located within ±30° with respect to the x-axis that passes through a center of the collimating lens 22 as shown in FIG. 5, it often comes within the acceptable range. Although the adhesive 21 is located above a center of the lens relative to the x-axis that runs in the main scanning direction in FIG. 4, it may be placed below the center.

The block 25 is secured onto a frame 70 on which the optical unit 100 is located. The block 25 is, for instance, made of aluminum.

The cylindrical lens 26 is held by a slidable holding member, and may slide in the direction z in FIG. 3. The holding member for the cylindrical lens 26 can change a width of light that passes the lens. It can adjust an orientation of the x-axis or the main scanning direction x. The collimated laser beam after passing through the collimating lens 22 is adjusted to become a desired laser beam with respect to the optical axis direction z and the main scanning direction x. As described above, when the temperature in the optical unit rises, the adhesive 21 that has bonded the lens barrel 24 and the collimating lens 22 would thermally expand mainly only in the main scanning direction x, and the thermal expansion quantity which cannot be adjusted by the cylindrical lens 26 is limited in the sub-scanning direction or the y-axis.

Figure 7:
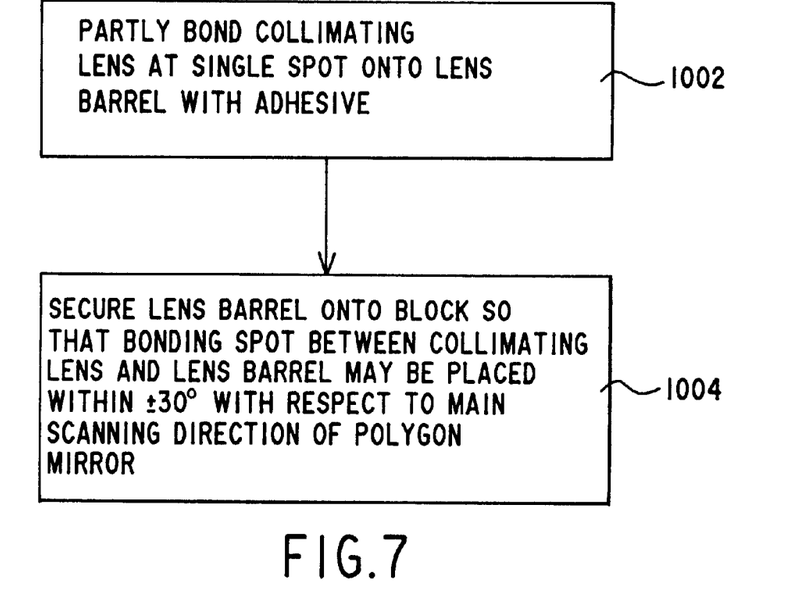
FIG. 7 is a flowchart describing a manufacturing method for the optical unit shown in FIG. 1.

Referring now to FIG. 7, a description will be given of a method of manufacturing (collimator section 20 in) the optical unit 100 of one embodiment of the present invention. First, the collimating lens 22 is partly bonded at a single spot in the lens barrel 24 with the adhesive 21 (step 1002). In the step 1002, as the lens barrel 24 has not been mounted on the block 25 yet, a straight line connecting the bonding spot where the adhesive 21 is placed, to a center of the collimating lens 22 may not necessarily be aligned with the main scanning direction of the polygon mirror 30. Next, the lens barrel 24 is secured with the leaf spring 28 onto the block 25 in such an orientation that the bonding spot between the collimating lens 24 and the lens barrel 24 may form an angle within ±30° with respect to the main scanning direction of the polygon mirror 30.

Although the adhesive is manually injected with the injector and the lens barrel 24 is manually secured on the block 25, the both operations may be performed automatically.

The foregoing acceptable range is set to compensate for human-induced errors with the above manual operations. Such an acceptable range setting may prevent as an incidental effect an increase of a manufacturing cost accompanied by an automatization of the collimator section 20.

As described above, the present manufacturing method does not consider a positioning adjustment between the bonding spot and the main scanning direction when bonding the collimating lens 22, while adjusting an alignment of the bonding spot with the main scanning direction when mounting the lens barrel 24 onto the block 25. However, a method which rotatably mounts the lens barrel onto the block and then adjusts an alignment of the bonding spot with the main scanning direction is substantially the same as the present manufacturing method, and thus regarded as a variation within the scope of the present invention. Moreover, the present manufacturing method does not preclude such a method as to first mount the lens barrel 24 onto the block 25 and then mount the collimating lens 22 while aligning it in the main scanning direction.

The polygon mirror 30, which is a deflector taking on a rotary polyhedron mirror, includes a regular hexagonal plate and six mirrors around its circumference as shown in FIG. 1, and rotates at thousands of rpm with a spindle motor (not shown). The polygon mirror 30 is a mirror that waggles the beam emitted from the laser light source 10 up and down. The spindle motor is one of the heat sources in the optical unit 100.

The f-θ lens 40 is provided to correct a deflection aberration that generates at both edges of a scanned surface. The cylindrical lens 42 corrects a surface tilt of the beams from the laser light source 10. The reflecting mirror 44 reflects the beam to the photosensitive drum (not shown) below the optical unit 100.

The folding mirror 50, which is located at an extremity of an area where the light reflected by the polygon mirror 30 may reach, reflects the laser light to the BD sensor (print start detector section) 60. The BD sensor 60 detects the laser beam reflected by the folding mirror 50, and a reference position for starting printing to recognize timing of a print start. The BD sensor 60 is made of a photo diode, for instance. There is a controller, though not shown in FIG. 1, controlling this BD sensor 60. An operation of the optical unit 100 will be described when an operation of the electrophotographic recording device is described.

The present invention may not preclude an application of any known technique for correcting a deviation in the main scanning direction. For example, Japanese Laid-Open Patent Application No. 9-76559 which was assigned to the instant assignee, disclosed a methodology of controlling light-emission timing from the laser light source 10 using a BD sensor 60, a delay circuit, and a laser light-emission timing creating circuit, and this methodology is applicable to the present invention. Alternatively, Japanese Laid-Open Patent Application No. 10-260368 which was also assigned to the present assignee, discloses a configuration of a beam shift device between the laser light source 10 and the polygon mirror 30, to shift the beams L1 and L2, and thereby correct a beam pitch. Further, the present invention may use a video clock signal generator for a laser printer disclosed in Japanese Laid-Open Patent Application No. 5-136950 which was also assigned to the present assignee. This generator includes a BD sensor 60, sawtooth wave generator means for outputting a sawtooth wave with a prescribed frequency, sampling means for sampling out the sawtooth wave when the BD sensor gives an output, and comparator means for comparing the sampled value obtained by the sampling means with the sawtooth wave and for giving an output for a period when the sawtooth wave is larger than the sampled value. A pulse signal synchronous with the output of the comparator means is used for the video clock signal, whereby a synchronous accuracy between a laser scanning and the video clock signal is improved.

Figure 8:
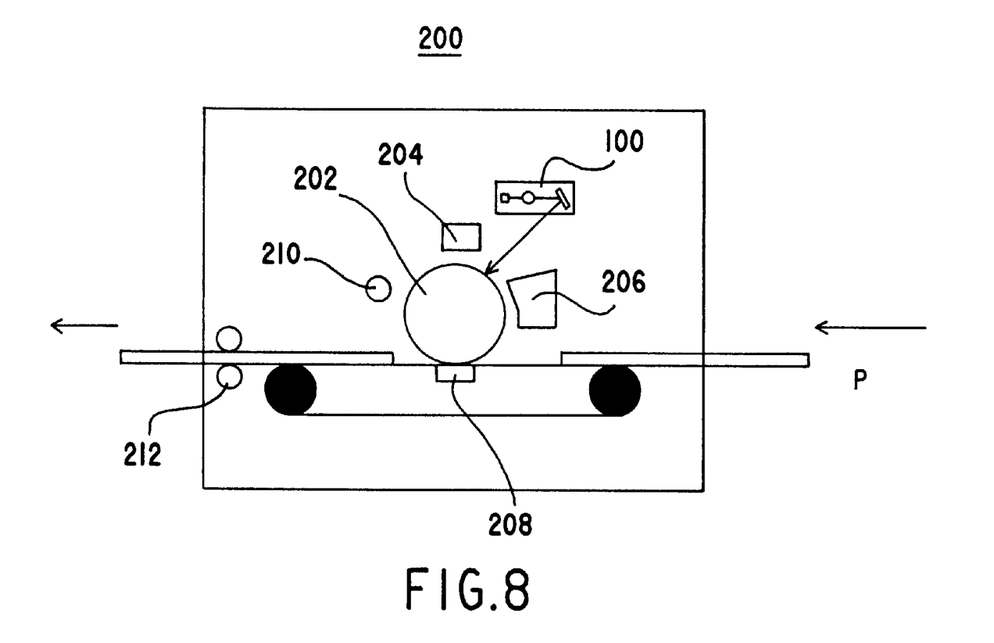
FIG. 8 is a schematic sectional block diagram of an essential part of a recording section of an electrophotographic recording device of one embodiment according to the present invention.
Figure 9:
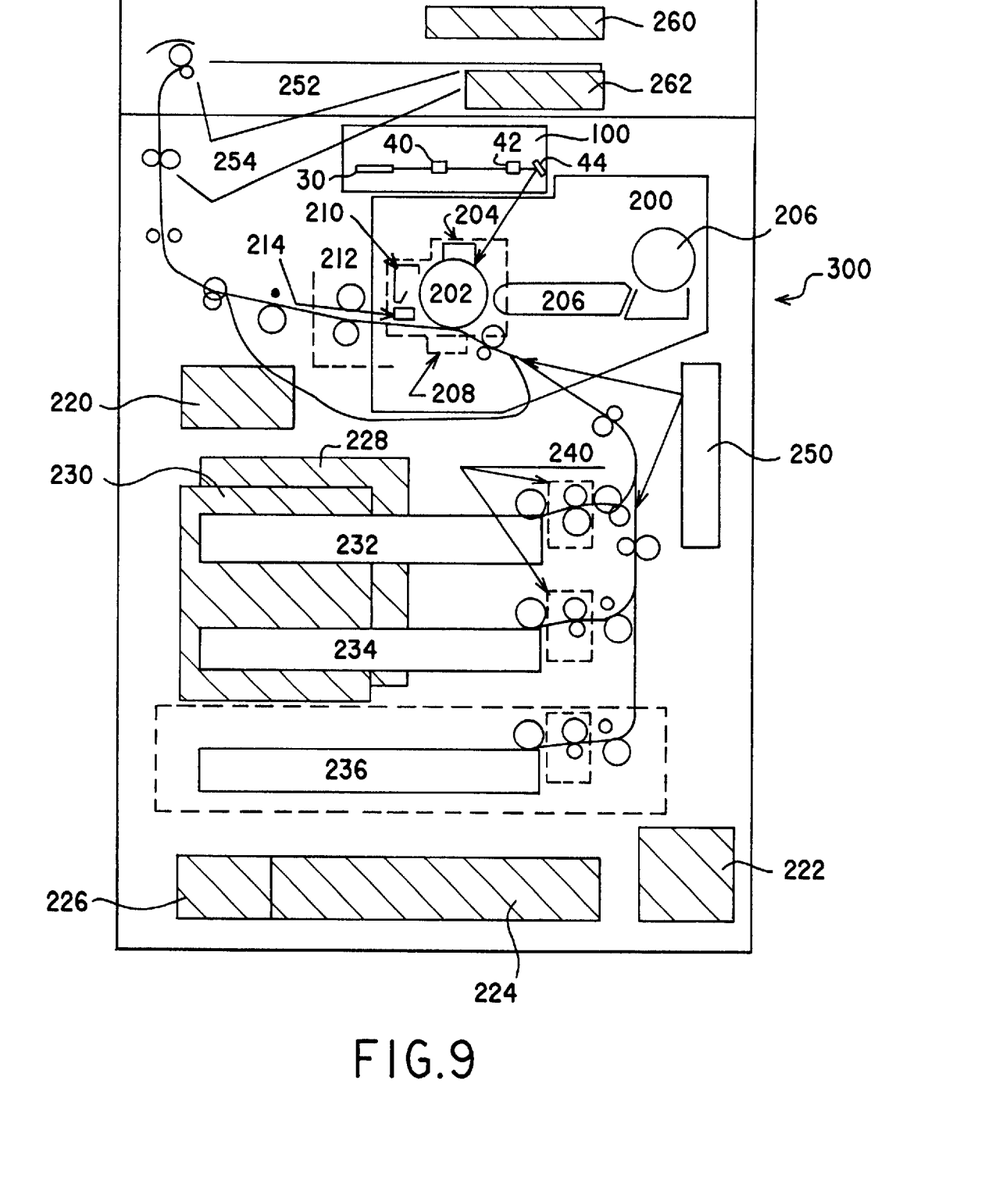
FIG. 9 is a schematic sectional block diagram of an essential part of the electrophotographic recording device including a sheet feeder system, etc. as more specifically illustrated than in FIG. 8.
Figure 10:
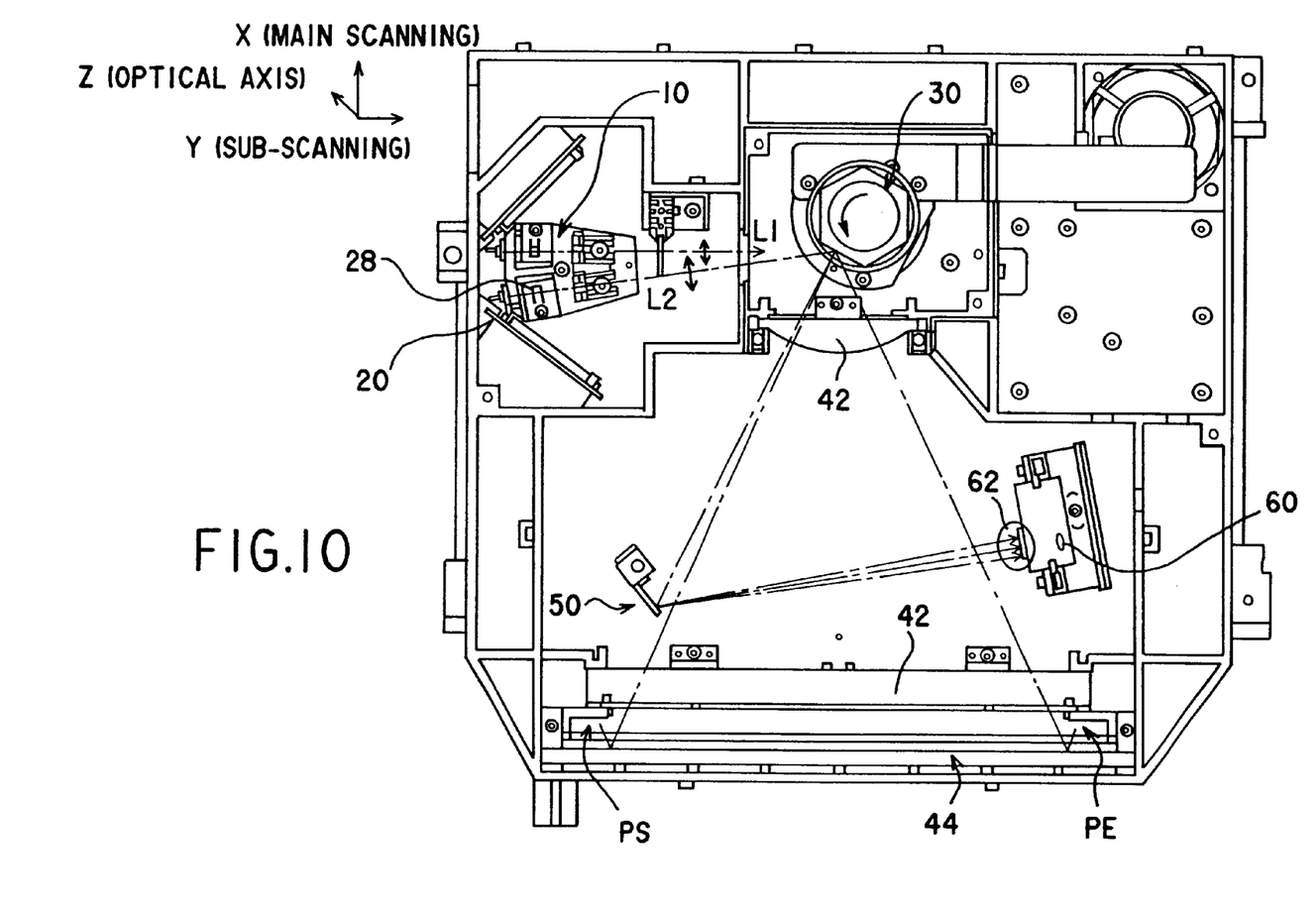
FIG. 10 is a plan view for explaining an action of the optical unit shown in FIG. 1.

A description will be given of the electrophotographic recording device 300 and the optical unit 100 having a recording section 200, with reference to FIGS. 8 to 10 inclusive. FIG. 8 is a schematic sectional block diagram of an essential part of the recording section 200 in the electrophotographic recording device 300. FIG. 9 is a schematic sectional block diagram of an essential part of the electrophotographic recording device 300 including a sheet feeder system, etc. as more specifically illustrated than in FIG. 8. FIG. 10 is a plan view for explaining an action of the optical Unit 100 shown in FIG. 1.

The recording section 200 in the recording device 300 according to the present invention comprises a photosensitive drum 202, a charger 204, an optical unit 100, a development device 206, a transfer unit 208, a cleaning section 210, a fixing section 212, a discharge lamp 214, and a print cartridge 216. A printing paper P is transferred from the right to the left in FIG. 8, and transferred upwardly from the bottom along an approximately S-shaped path.

The photosensitive drum 202 includes a photosensitized dielectric layer on a rotatable drum-shaped conductor support, and used for an image holding member. For instance, the photosensitive drum 202 is made by applying a function separation-type organic photoreceptor with a thickness of about 20 $\mu$m on a drum-shaped aluminum member, and rotates at a circumferential velocity of 70 mm/s to move in the arrow direction at a speed of 30 mm/s. The charger 204 is a scorotron electrifying device, which has a property of giving a constant amount of electric charges on the photosensitive drum 202. The photosensitive drum can thereby charged on its surface uniformly at about −700 V.

The optical unit 100, as described above, incorporates the semiconductor laser 12 as a light source 10, and the light in accordance with a document falls on the photosensitive drum 202 and exposure is performed on the photosensitive drum 202. The exposure neutralizes a potential on the photosensitive drum 202, and a latent image corresponding to an image data to be recorded is formed.

As shown in FIG. 9, the optical unit 100 is located in an upper portion in the electrophotographic recording device 300. Each unit is incorporated at a lower portion. These units include the recording section 200, a high-voltage power supply 220, a main power switch 222, a low-voltage power supply 224, a hard disk 226, a control unit 228, a main control unit 230, an upper hopper 232, a middle hopper 234, a lower hopper 236, a sheet feeder unit 240, and a sheet feeder section 250. Further, the recording device 300 includes a eject tray 252, a page tray 254, an operation panel 60, and a floppy disk drive 262. As any devices known in the art may be adopted in these units, a detailed description will now be omitted. Each unit, when working, generates heat. In addition, the paper P, when printed, retains heat too. The heat adversely affects the optical unit 100. It goes without saying that the spindle motor and control board (not shown) in the optical unit 100 also generates heat as described above.

The development device 206 uses a developer, supplies to the photosensitive drum the developer or a fine charged particle supplied from a toner cartridge (not shown), and forms a toner image on the photosensitive drum 202 by an electrostatic force between the photosensitive drum 202 and the charged developer, visualizing the image. The toner is may include one or two components (i.e., including a carrier). The transfer unit 208 includes a transfer roller (not shown), generates an electronic field to electrostatically adsorb the toner, and transfers the toner image adsorbed on the photosensitive drum 202 onto the printing paper P by utilizing a transfer current.

After the transfer, the cleaning section 210 collects and disposes of toner remaining on the photosensitive drum 202, or as necessary returns the collected toner to the toner cartridge (not shown). The cleaning section 208 also serves to prevent charged debris of paper or the like other than toner from bringing a detrimental effect on a charged state of toner and lowering its printing performance. The cleaning section 210 can utilize varied kinds of energy including magnetic force and rubber friction to remove the toner and charges on the photosensitive drum 202.

The fixing device 212 is for permanently fixing toner onto the paper P. The transferred toner is adhered onto the paper P with a weak force, and thus easily fallen off. Thus, the toner needs to be fixed by energy such as pressure and heat, and it is necessary to make solid toner into liquid toner in order to obtain a sufficient fixing performance. The added energy makes the solid toner semifluid, spread and penetrant, completing the fixture. The discharge lamp 214 eliminates charges on the printing paper.

In operation of the recording device 300 shown in FIG. 8, the photosensitive drum 202 carries a uniform negative charge (at about −700V) applied by the charger 204. When the laser beam is emitted from the optical unit 100 onto the photosensitive drum 202, the uniform charge on the photosensitive drum 202 is partly eliminated by exposure to light with the laser beam, and an area corresponding to an image is discharged to form a latent image.

To be more specific, as shown in FIGS. 1 and 10, the laser beams L1 and L2 emitted by the laser light source 10 comprised of the semiconductor laser 12 pass through the collimator section 20, and are thereby converted from diffusing beams to collimated beams. The collimated beams are reflected on the polygon mirror 30 as the scanning section. Subsequently, deflection aberrations in the laser beams are eliminated by the effect of the lens 40, and the laser beams go to the folding mirror 50. Then, the BD sensor 60 detects the laser beam, whereby a beam-emitting position is adjusted by the print start position (see a circled area 62 in the figure). The area 62 serves to restrict a deviation of the beam-emitting position to a controllable direction (namely, the main scanning direction). On the other hand, the beams that have passed through the cylindrical lens 42 and corrected its surface tilt are emitted from the reflecting mirror 44 onto the photosensitive drum 202 shown in FIGS. 8 and 9. In FIG. 10, PS denotes a print start, while PE denotes a print end. Thereafter, the exposure ends, and a latent image is formed on the photosensitive drum 202.

Even if a temperature rise in the optical unit 100 by the foregoing reasons during an operation of the recording section 200 would displace the collimating lens, its displacing direction is limited mainly to the main scanning direction, and therefore the polygon mirror 30 and the BD sensor 60 can catch the laser beams from the optical unit 100. As a result, the polygon mirror 30 reflects the laser beams, so a latent image is reliably formed on the photosensitive drum 202. The BD sensor 60 thus detects the laser beams, whereby a controller (not shown) in the recording device 200 can securely obtain the print timing.

Thereafter, the latent image is developed in the developing device 206. To be more specific, a charged particle (or powder) of toner at about −50 V is attracted to a discharged area on the photosensitive drum 202 by the electrostatic force. Consequently, the latent image on the photosensitive drum 202 is visualized as a toner image. The toner image is transferred onto a printing paper P conveyed in perfect timing. Resultantly, the toner image on the photosensitive drum 202 is adsorbed and deposited onto the printing paper P, and thus the toner image is transferred on the printing paper P. The cleaning section 60 collects remaining toner on the photosensitive drum 202. The toner on the printing paper P then passes in the fixing device 212, and thereby permanently fixed; thereafter the printing paper P is ejected out of the recording device 100.

The present embodiment is configured to use two laser light sources 10 in order to achieve a high-resolution and high-speed printing. Although the conventional increased displacement of the laser beam would disadvantageously make a contour of the latent image thick preventing a high-quality image, the present invention has solved this problem and provided the high-quality images successfully.

Although the preferred embodiments of the present invention have been described above, the present invention is, needless to say, not restricted to these embodiments, and it is to be understood that various modifications and changes may be made without departing from the spirit and scope thereof.

According to an optical unit and recording device having such an optical unit as one embodiment of the present invention, if temperature in the optical unit rises, displacement of the collimating lens mainly occurs in the main scanning direction of the scanner section, and that in the sub-scanning direction of the scanning section is limited only to an acceptable quantity. Consequently, a recording operation and printing performance successfully making a latent image can be maintained without an expensive cooling device or correcting means in the sub-scanning direction. In addition, according to a method of manufacturing an optical unit as another embodiment of the present invention, even if an injection of an adhesive and an attachment to a lens barrel are carried out manually, the above optical unit can be obtained. Moreover, an alignment of the bonding spot with the main scanning direction need not be considered when the collimating lens is to be bonded, and thus it is easy to manufacture it.

What is claimed is:

1. An optical unit comprising:
   a collimator section which collimates a beam radiated from a light source; and
   a scanner section which scans using a beam from said collimator section,
   wherein said collimator section includes:
      a lens barrel movable relative to said scanner section; and
      a collimating lens collimating said beam radiated from said light source and partly bonded at a single spot with an adhesive onto an inner surface of said lens barrel, the spot between said collimating lens and said lens barrel being placed within an adjustable angular range with respect to a main scanning direction of said scanner section.

2. An optical unit according to claim 1, wherein said adjustable angular range is within ±30° with respect to the main scanning direction of said scanner section.

3. An optical unit according to claim 1, wherein said spot is placed within ±11.5° with respect to the main scanning direction of said scanner section.

4. An optical unit according to claim 1, wherein said adhesive is an ultraviolet cure adhesive.

5. An optical unit according to claim 1, comprising a plurality of light sources and corresponding number of collimator sections.

6. A method of manufacturing an optical unit which comprises a collimator section that collimates a beam radiated from said ight source and includes a block, a lens barrel and a collimating lens, and a scanner section that scans using a beam from said collimator section, said manufacturing method comprising the steps of:

partly bonding said collimating lens at a single spot with an adhesive onto an inner surface of said lens barrel; and rotating and fixing said lens barrel onto said block so that said spot between the collimating lens and the lens barrel may be placed with ±30° with respect to a main scanning direction of said scanner section.

7. A manufacturing method according to claim 6, wherein said spot is placed within ±11.5° with respect to the main scanning direction of said scanner section.

8. A manufacturing method according to claim 6, wherein said adhesive is an ultraviolet cure adhesive.

9. An electrophotographic recording device comprising:

a photosensitive body;

a pre-charger which charges said photosensitive body;

an optical unit which exposes said photosensitive body and forms a latent image thereon;

a development device which visualized the latent image as a toner image with a developer;

a transfer device which transfers said toner image onto a recorded medium; and a fixing device which fixes said toner image onto the recorded medium, wherein said optical unit comprises:

a collimator section which collimates a beam radiated from a light source; and a scanner section which scans using a beam from said collimator section, wherein said collimator section includes:

a block;

a lens barrel movable relative to said scanner section and secured onto said block; and a collimating lens which is partly bonded at a single spot with an adhesive onto an inner surface of said lens barrel, said spot being placed within ±30° with respect to a main scanning direction of said scanner section.

10. An electrophotographic recording device, according to claim 9, wherein said spot is placed within ±11.5° with respect to the main scanning direction of said scanner section.

* * * * *